Dec. 12, 1944.  C. G. COMER ET AL  2,364,602
TRANSFER UNIT
Filed Feb. 14, 1942
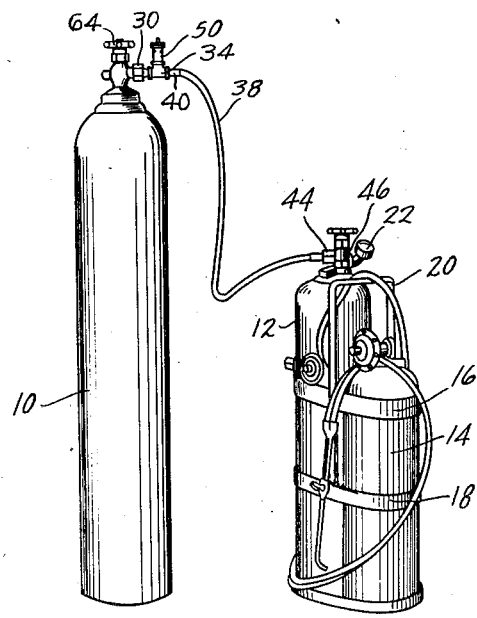
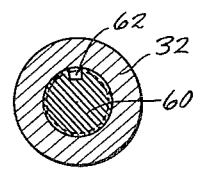
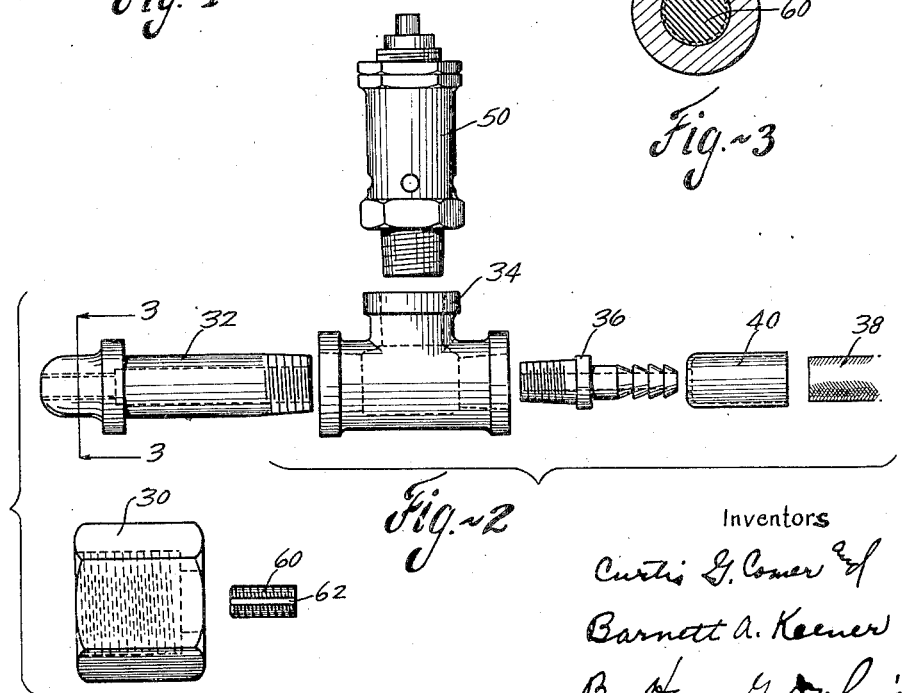
Inventors
Curtis G. Comer
Barnett A. Keener
By Henry G. Dyluig
Attorney Patented Dec. 12, 1944

2,364,602

UNITED STATES PATENT OFFICE 2,364,602

TRANSFER UNIT

Curtis G. Comer, Dayton, and Barnett A. Keener,
New Lebanon, Ohio

Application February 14, 1942, Serial No. 430,924

1 Claim. (Cl. 138—40)

This invention relates to a connector unit for connecting a utility tank to a source of supply and more particularly to a connector unit provided with a safety device for interconnecting a high pressure source of supply to a low pressure tank.

The advent of light weight portable welding units adapted to be moved from place to place by an operator who may carry an individual unit has led to certain complications and problems in charging the oxygen tank, in that the source of supply may contain oxygen under extremely high pressure, higher than the permissible pressure in the oxygen tank on the welding unit. In the first place, it was necessary to provide a safety valve or a pop-off valve on the oxygen tank. In the second place, certain problems were encountered in connection with the connecting unit. If a connecting unit were to be used sufficiently strong to withstand the high pressure of the oxygen in the supply tank or source of supply, such connecting units would be excessively heavy, expensive and cumbersome to handle.

An object of this invention is to provide a safe transfer connector for transferring a gas from a source of high pressure to a low pressure tank, which connector is sufficiently strong to withstand pressures equal to the low pressure in the low pressure tank without having sufficient strength to withstand the high pressures.

Another object of this invention is to provide a transfer connector provided with a restricted orifice.

Another object of this invention is to provide a transfer connector having a pressure release mechanism or safety valve releasing the gases at a pressure lower than the safe pressure for the transfer connector.

Another object of this invention is to provide a safe transfer connector for use in transferring gas from a source of gas having a pressure exceeding the maximum pressure strength of the transfer connector.

Other objects and advantages reside in the construction of parts, the combination thereof and the mode of operation, as will become more apparent form the following description.

In the drawing, Figure 1 is a perspective view showing a high pressure oxygen tank, a portable welding unit and a transfer connector for interconnecting the high pressure oxygen tank to the oxygen tank on the welding unit.

Figure 2 is an exploded view of the connector unit shown on a larger scale than Figure 1.

Figure 3 is a cross sectional view of the restricted orifice and parts associated therewith, taken substantially on the line 3—3 of Figure 2, Figure 3 being drawn to twice the scale used in Figure 2.

In spite of the fact that a safety valve or pop-off valve may be used on the small oxygen tank, which is a low pressure oxygen tank, there is danger of supplying a high pressure to the transfer connector for transferring gas from a high pressure tank to a low pressure tank. If the operator manipulates the equipment properly, the one safety valve on the low pressure tank will release the pressure in the transfer connector unit whenever a predetermined pressure is reached; but in the event the operator neglects to open the valve between the connector unit and the low pressure tank before he opens the valve between the connector unit and the high pressure tank, a high pressure is created in the connector unit. That being the case, in order to protect the connector unit, this is provided with both a restricted orifice at the intake end and a safety valve, as will appear more fully from the detailed description of the drawing that follows.

Referring to the drawing, the reference numeral 10 indicates a high pressure tank. This will be referred to as an oxygen tank, although it is not limited to oxygen, as it may contain any suitable gas. Oxygen under high pressure is to be transferred from the oxygen tank 10 to a small low pressure oxygen tank 12, forming a part of the welding unit which may include an acetylene tank 14, a pair of hoops 16 and 18 and a suitable handle 20, as more fully described in our copending application Serial No. 370,426 filed December 16, 1940, for Portable welding unit. The low pressure oxygen tank 12 may be provided with a suitable gauge 22 and a pop-off valve that has not been shown.

The transfer connector unit for supplying oxygen from the high pressure tank 10 to the low pressure tank 12 includes an adapter such as a nut or union 30 and a nipple 32 threadedly engaging a suitable T 34. A hose engaging nipple or connecting unit 36 threadedly engages the T 34 and has connected thereto one end of a suitable conduit such as a hose 38, having this end encircled by a metallic clip or sleeve 40. The opposite end of the hose 38 is provided with an adapter 44, threadedly engaging an extension of the valve 46. A pop-off valve 50 threadedly engages the other outlet of the T 34. The pop-off valve or safety valve 50 may be of any suitable construction adapted for the particular pressure used.

In order to restrict the flow of oxygen from the high pressure tank 10, a suitable plug 60 provided with a longitudinally extending saw-cut groove 62 threadedly engages the passage in the nipple 32. This restricted orifice limits the rate of flow of oxygen from the high pressure tank 10. Without this restricted orifice, the oxygen would almost instantaneously fill the transfer connector unit with oxygen under high pressure, causing the hose to explode, in the absence of protective devices. As a matter of fact, with a safety valve there would be danger of exploding the hose unless the safety valve would have sufficient capacity to release the pressure and permit the escape of the oxygen from the transfer connector at the same rate of speed that it would enter this connector. By providing a restricted orifice, a much smaller safety valve may be used. Furthermore, the restricted orifice functions as a safety device as far as the low pressure tank is concerned.

Mode of operation

The valve 64 on the high pressure oxygen tank and the valve 46 on the low pressure oxygen tank, prior to charging of the low pressure tank, are normally closed. The transfer connector unit has one end connected to a threaded extension on the valve 64 by the union or nut 30. The opposite end of the connector unit is connected by the nut or union 44 to a threaded extension of the valve 46. The valve 46 may then be opened. After the valve 46 has been opened, the valve 64 is opened, causing the high pressure oxygen to slowly flow through the restricted orifice, through the transfer connector into the low pressure tank 12, so as to charge this tank. The oxygen is permitted to flow until the desired pressure is registered on the gauge 22, when the valve 64 should be closed. After the valves 64 and 46 are closed, the transfer connector unit may be disconnected from both the tank 10 and the tank 12.

In the event the operator should fail to open the valve 46 before he opens the valve 64, or in the event the operator should close the valve 46 before he closes the valve 64, the pressure in the connector unit would gradually rise. However, this pressure is released by the pop-off valve or safety valve 50, protecting the connector unit from excessive pressure. Thus, it is seen that the restricted orifice cooperates with the safety valve found on the connector unit to protect these from excessive pressure and to protect the parts associated with the connector unit from failure.

Although the preferred modification of the device has been described, it will be understood that within the purview of this invention various changes may be made in the form, details, proportion and arrangement of parts, the combination thereof and mode of operation, which generally stated consists in a device capable of carrying out the objects set forth, as disclosed and defined in the appended claim.

Having thus described our invention, we claim:

In a transfer connector for transferring a high pressure gas from a high pressure source of supply to a low pressure tank, a restricted flow adapter assembly including a nipple member terminating in a spherical portion adapted to be connected to a high pressure source, a union nut, said nipple member being provided with a collar against which the nut is seated, said nipple member being provided with internal threads, and a screw threaded plug threadedly engaging the passage of the nipple, said plug having a peripherally disposed saw cut groove extending across all of the threads in the plug to provide a channel parallel to the longitudinal axis of the plug so as to restrict the passage through the nipple to limit the flow of the fluid through the adapter.

CURTIS G. COMER.
BARNETT A. KEENER.